United States Patent
Minami et al.

(10) Patent No.: US 11,084,901 B2
(45) Date of Patent: Aug. 10, 2021

(54) POLYESTER RESIN FOR HEAT-SHRINKABLE FILM, HEAT-SHRINKABLE FILM, HEAT-SHRINKABLE LABEL, AND PACKAGED PRODUCT

(71) Applicant: TOYOBO CO., LTD., Osaka (JP)

(72) Inventors: Soichiro Minami, Tsuruga (JP); Hideto Ohashi, Tsuruga (JP); Masayuki Haruta, Tsuruga (JP); Shintaro Ishimaru, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 121 days.

(21) Appl. No.: 16/603,580

(22) PCT Filed: Apr. 16, 2018

(86) PCT No.: PCT/JP2018/015652
§ 371 (c)(1),
(2) Date: Oct. 7, 2019

(87) PCT Pub. No.: WO2018/198845
PCT Pub. Date: Nov. 1, 2018

(65) Prior Publication Data
US 2021/0108027 A1 Apr. 15, 2021

(30) Foreign Application Priority Data

Apr. 27, 2017 (JP) .............................. JP2017-088278

(51) Int. Cl.
| | | |
|---|---|---|
| C08G 63/183 | (2006.01) | |
| B29C 61/06 | (2006.01) | |
| C08G 63/672 | (2006.01) | |
| B29K 67/00 | (2006.01) | |

(52) U.S. Cl.
CPC ............ *C08G 63/183* (2013.01); *B29C 61/06* (2013.01); *C08G 63/672* (2013.01); *B29K 2067/00* (2013.01); *B29K 2995/002* (2013.01); *B29K 2995/0049* (2013.01); *C08J 2367/02* (2013.01)

(58) Field of Classification Search
USPC ................................................. 528/271, 272
See application file for complete search history.

(56) References Cited

U.S. PATENT DOCUMENTS

| | | |
|---|---|---|
| 7,439,317 B2 | 10/2008 | Suzuki et al. |
| 7,829,655 B2 | 11/2010 | Endo et al. |
| 2009/0131628 A1 | 5/2009 | Katsuma |
| 2011/0224369 A1 | 9/2011 | Kim et al. |
| 2018/0208375 A1 | 7/2018 | Haruta et al. |
| 2019/0375552 A1 | 12/2019 | Haruta et al. |

FOREIGN PATENT DOCUMENTS

| | | |
|---|---|---|
| EP | 2365025 A1 | 9/2011 |
| EP | 3581604 A1 | 12/2019 |
| JP | H05-033895 A | 5/1993 |
| JP | 2004-123984 A | 4/2004 |
| JP | 2004-175937 A | 6/2004 |
| JP | 2005-097580 A | 4/2005 |
| JP | 2007-079280 A | 3/2007 |
| JP | 2007-196679 A | 8/2007 |
| JP | 4411556 B2 | 2/2010 |
| JP | 2011-046829 A | 3/2011 |
| JP | 2011-068879 A | 4/2011 |
| JP | 2011-068880 A | 4/2011 |
| JP | 2012-144744 A | 8/2012 |
| JP | 5249997 B2 | 7/2013 |
| JP | 2017-177677 A | 10/2017 |
| WO | WO 2003/085027 A1 | 10/2003 |
| WO | WO 2006/095627 A1 | 9/2006 |
| WO | WO 2016/083521 A1 | 6/2016 |
| WO | WO 2017/018345 A1 | 2/2017 |
| WO | WO 2018/147249 A1 | 8/2018 |

OTHER PUBLICATIONS

European Patent Office, Extended European Search Report in European Patent Application No. 18791793.5 (dated Nov. 30, 2020).
Japanese Patent Office, International Preliminary Report on Patentability in International Patent Application No. PCT/JP2018/015652 (dated Nov. 7, 2019).
Japanese Patent Office, International Search Report in International Patent Application No. PCT/JP2018/015652 (dated Jul. 10, 2018).

*Primary Examiner* — Terressa Boykin
(74) *Attorney, Agent, or Firm* — Leydig, Voit & Mayer, Ltd.

(57) ABSTRACT

The invention provides a polyester resin for heat-shrinkable film which contains terephthalic acid as a main component of a dicarboxylic acid component, contains ethylene glycol as a main component of a diol component, and contains from 18 to 32% by mol of neopentyl glycol and from 8 to 16% by mol of diethylene glycol when a total amount of the whole diol component in total polyester resin components is taken as 100% by mol. The polyester resin has an intrinsic viscosity (IV) of from 0.70 to 0.86 dl/g, a carboxyl end group concentration (AV) of from 8 to 25 eq/t, and a color b value of from 1.0 to 12.0 in an L*a*b color system. The invention also provides a heat-shrinkable film prepared from the aforementioned polyester resin, as well as a heat-shrinkable label and packaged product.

4 Claims, No Drawings

POLYESTER RESIN FOR HEAT-SHRINKABLE FILM, HEAT-SHRINKABLE FILM, HEAT-SHRINKABLE LABEL, AND PACKAGED PRODUCT

CROSS-REFERENCE TO RELATED APPLICATIONS

This patent application is the U.S. national phase of International Patent Application No. PCT/JP2018/015652, filed Apr. 16, 2018, which claims the benefit of Japanese Patent Application No. 2017-088278, filed Apr. 27, 2017, which are incorporated by reference in their entireties herein.

TECHNICAL FIELD OF THE INVENTION

The present invention relates to a heat-shrinkable polyester resin which is suitable for a use as a heat-shrinkable label and which is excellent in the recycling property, and also relates to a heat-shrinkable film, a heat-shrinkable label and a packaged product using the same.

BACKGROUND ART

In a use as a label package, a cap seal, an assembling packaging, etc. acting both as a protector of glass bottles, plastic bottles or the like and as an indicator of products, a heat-shrinkable polyester-based film which exhibits high heat resistance, easy burning, and excellent solvent resistance has been widely used as a shrinking label in recent years. A use amount thereof tends to increase as a result of an increase in PET (polyethylene terephthalate) bottle containers, etc.

As a heat-shrinkable polyester-based film, a film which greatly shrinks in a widthwise direction has been widely utilized up to now. In addition, in order to make a finish after shrinking better, a film wherein a shrinking rate in a lengthwise direction which is a non-shrinking direction is adjusted to be minus (i.e., a film which stretches by heating) has been also known (see Patent Document 1).

In the heat-shrinkable polyester-based film, it has been proposed to adjust the shrinking rate to be high in order to deal with various containers (see Patent Documents 2 and 3). However, in such film having high shrinking rate, there are problems that a natural shrinking rate after being stored at an ordinary temperature (after an aging) becomes high, and that a heat-shrinking rate in hot water measured at 70° C. lowers. In Patent Document 2, the natural shrinking rate is improved by adopting a production method wherein the film is subjected to a biaxial stretch, and to a strengthening by cooling after a biaxial orientation and a longitudinal stretch. However, there is no consideration in Patent Document 2 on the heat-shrinking rates in hot water measured at 70° C. before and after the aging. In Patent Document 3, although the natural shrinking rate has been improved, technical findings concerning the improvement in the natural shrinking rate are not disclosed. In addition, values of the shrinking rates at 70° C. before and after the aging are not considered. When a decrease in the shrinking rate at 70° C. is large, initial shrinking rates in conducting the shrinking are different before and after the aging whereby there is resulted a problem that a finish after shrinking becomes bad. Particularly, in a shrinking apparatus using a hot air having low heat transfer coefficient, there are resulted problems of an insufficient shrinking and a distortion of labels upon finishing if the initial shrinking rates by hot air are different before and after the aging.

With regard to these problems, the Applicant has proposed a copolymerized polyester raw material for film containing terephthalic acid as a main component of a dicarboxylic acid component, containing ethylene glycol as a main component of a diol component, and containing specific amounts of neopentyl glycol and diethylene glycol, wherein intrinsic viscosity and melt viscosity of the material are set to be within specific ranges (see Patent Document 4). Although this copolymerized polyester raw material can reduce the problems of the natural shrinking rate during film formation and the heat-shrinking rate in hot water measured at 70° C., a decomposition reaction is apt to take place as compared with PET and heat resistance is bad whereby there is yet some room for improvement in a recycling property therein.

PRIOR ART DOCUMENTS

Patent Documents

Patent Document 1: Japanese Patent Pregrant Publication (JP-B) No. 33895/93
Patent Document 2: Japanese Patent No. 4411556
Patent Document 3: Japanese Patent No. 5249997
Patent Document 4: Japanese Patent Application No. 2017-024183

DISCLOSURE OF THE INVENTION

Problem that the Invention is to Solve

The present invention has been done for solving the problems as such in the prior art. The object of the present invention is to provide a polyester resin for heat-shrinkable film which can give film characteristics being suitable for a use as a heat-shrinkable label (i.e. a film which exhibits a high heat-shrinking rate in a main shrinking direction, and which exhibits a small natural shrinking rate and small changes in the shrinking rate even if the film is subjected to an aging treatment) and which is excellent in the recycling property, and also to provide a heat-shrinkable film, a heat-shrinkable label and a packaged product using the same.

Means for Solving the Problem

The inventors have conducted extensive investigations for achieving such an object and found that, when a copolymerized polyester resin as mentioned in the Patent Document 4 (i.e. a copolymerized polyester resin consisting of a specific composition containing ethylene glycol as a main component of a diol component and further containing specific amounts of neopentyl glycol and diethylene glycol) is used, there are problems such as that (i) a decrease in the intrinsic viscosity becomes significant in a melt extrusion step of a film-preparation process whereby a demanded strength may not be ensured, (ii) yellowish tint of the film becomes significant due to the decomposition reaction which results in a problem in view of quality and (iii) a decrease in the intrinsic viscosity proceeds in a recycling step wherein a film end is re-melted to give a recovered raw material and, as a result thereof, the recovered raw material cannot be contained in the raw material at a high rate during the film preparation thereby causing a problem in terms of cost. The inventors have then further conducted extensive investigations for solving those problems and, as a result, they have found that, when not only the intrinsic viscosity but also a carboxyl end group concentration and a color b value in the copolymerized polyester resin consisting of the above-mentioned specific composition are set to be within specific ranges, it is now possible to solve the above problems and to provide a polyester resin for heat-shrinkable film being excellent in both terms of the film characteristics and the recycling property whereupon the present invention has been accomplished.

The present has been achieved on the basis of the above findings and has the constituent features of the following (1) to (4).

(1) A polyester resin for heat-shrinkable film which contains terephthalic acid as a main component of a dicarboxylic acid component, contains ethylene glycol as a main component of a diol component, and contains from 18 to 32% by mol of neopentyl glycol and from 8 to 16% by mol of diethylene glycol when a total amount of the whole diol component in total polyester resin components is taken as 100% by mol, characterized in that it satisfies the following requirements (i) to (iii):

(i) The polyester resin has an intrinsic viscosity (IV) of from 0.70 to 0.86 dl/g;

(ii) The polyester resin has a carboxyl end group concentration (AV) of from 8 to 25 eq/t; and (iii) The polyester resin has a color b value of from 1.0 to 12.0 in an L*a*b color system.

(2) A heat-shrinkable film, characterized in that, it contains the polyester resin for heat-shrinkable film mentioned in (1).

(3) A heat-shrinkable label which is characterized in being prepared by using the heat-shrinkable film mentioned in (2).

(4) A packaged product which is characterized in being formed by coating the heat-shrinkable label mentioned in (3) at least on a part of an outer periphery of a target to be packaged followed by subjecting to a heat-shrinking treatment.

Advantages of the Invention

The heat-shrinkable film of the present invention exhibits not only a high shrinking rate but also a small decrease in the natural shrinking rate after the aging and in the shrinking rate measured at 70° C. Therefore, even after stored for a long period in a storehouse or the like, its size change in the main shrinking direction is small. Therefore, the film product exhibits good appearance because of little wrinkles, slacks, etc. As a result, troubles in processing steps such as a printing step can be decreased. In addition, a decrease in the shrinking rate at 70° C. before and after the aging is small in a step wherein the film is actually subjected to heat-shrinking after the printing step so as to form into a label. Therefore, regardless whether the used film is before the aging or after the aging, it is possible to achieve an industrially stable shrinking in a continued manner under the same shrinking condition.

Also, the heat-shrinkable film of the present invention exhibits not only the high shrinking rate but also a low shrinking stress. Therefore, it is suitably used even for containers having thin thickness. Accordingly, it is now possible to provide a heat-shrinkable film which can package targets in broader ranges than before.

In the polyester resin for heat-shrinkable film according to the present invention, a polyester resin consisting of a specific composition is used and the intrinsic viscosity and the carboxyl end group concentration are controlled to be within specific ranges whereby it is now possible to suppress deterioration of physical properties during the film preparation of a heat-shrinkable film. Moreover, in the material recycling wherein the film which was once made into a waste is recovered and re-used as a raw material, the recovered raw material can be contained in the raw material at a high rate.

Also, a packaged product which is packaged with a label prepared from the heat-shrinkable film of the present invention can exhibit a beautiful appearance.

BEST MODE FOR CARRYING OUT THE INVENTION

Hereinafter, the heat-shrinkable film of the present invention and the polyester resin used therefor will be described in detail. As will be mentioned in detail later, a heat-shrinkable film is usually prepared by conveying and stretching a film by using a roll or the like. At that time, a conveying direction of the film is called a lengthwise direction and an orthogonal direction to the above lengthwise direction is called a widthwise direction of the film. Accordingly, the widthwise direction of the heat-shrinkable film shown below is a direction which is vertical to an unwinding direction of the roll while the lengthwise direction of the film is a direction which is parallel to the unwinding direction the roll.

One of the means for preparing a more highly-shrinkable film is a means to increase an amount of a monomer component constituting the unit which can become an amorphous component in the film (hereinafter, it will be referred to just as an amorphous component). In a film prepared by a conventional transversely uniaxial stretch method, when the amount of the amorphous component is increased, the shrinking rate increases proportionally thereto. However, when the amount of the amorphous component is simply increased, it has been found that, although the high shrinking is possible thereby, there are resulted disadvantages such as that the natural shrinking rate increases and the shrinking rate measured at a low temperature of about 70° C. lowers after the aging. It has been also found that, when the amount of the amorphous component is increased, an unevenness in the thickness becomes worse and an appearance of the film product roll is deteriorated. Under such circumstances, the inventors have paid their attention to diethylene glycol (hereinafter, it will be also referred to just as "DEG").

When an amount of diethylene glycol increases, heat resistance becomes bad and discharge of foreign matters increases in a melt extrusion. Therefore, diethylene glycol has not been positively used up to now. However, the present inventors found that, when diethylene glycol is used as a constituent unit of a polyester resin, stretching stress during stretch of a film lowers and, in addition, a decrease in the shrinking rate after the aging being measured at a low temperature of about 70° C. can be suppressed.

The polyester resin for heat-shrinkable film according to the present invention contains an ethylene terephthalate unit as a main component. To be more specific, in all of the resin components, terephthalic acid is used as a main component of a dicarboxylic acid component and ethylene glycol is used as a main component of a diol component. Hereinabove, the "main component" in the dicarboxylic acid component or in the diol component means that it occupies 50% by mol or more in each of the components. Preferably, it occupies 60% by mol or more, and more preferably, it occupies to be 70% by mol or more.

As to other dicarboxylic acid components constituting the polyester resin of the present invention other than terephthalic acid, there are exemplified an aromatic dicarboxylic acid such as isophthalic acid, orthophthalic acid and 2,6-naphthalene-dicarboxylic acid, an aliphatic dicarboxylic acid such as adipic acid, azelaic acid, sebacic acid and decanedicarboxylic acid and an alicyclic dicarboxylic acid such as 1,4-cyclohexanedicarboxylic acid. In the present invention, it is preferred that no dicarboxylic acid component other than terephthalic acid is contained therein.

Hereunder, an interpretation for a phrase "can become an amorphous component" mentioned above will be mentioned in detail. An "amorphous polymer" specifically stands for a polymer which does not show endothermic peak by melting in a measurement using a DSC (differential scanning colorimeter). In the amorphous polymer, crystallization does not substantially proceed. Accordingly, the amorphous polymer cannot assume a crystalline state or, even if crystallized, its degree of crystallization is very low. A "crystalline polymer" stands for a polymer which is not the above "amorphous polymer". That is, the "crystalline polymer" stands for a polymer which shows endothermic peak by melting in the measurement using a DSC (differential scanning colorimeter). The crystalline polymer is such a one which can be crystallized when the polymer is heated, or which can become crystallized, or is crystallized already.

Generally speaking, when a polymer being in such a state wherein many monomer units are bonded satisfies various conditions such as that stereoregularity of the polymer is low, symmetry of the polymer is bad, side chain of the polymer is big, branching of the polymer is abundant, or intermolecular cohesive force among polymers is small, it becomes an amorphous polymer. However, depending upon an existing state, there may be a case wherein crystallization well proceeds to result in a crystalline polymer. For example, even if a polymer has a big side chain, when the polymer is constituted from a single monomer unit, there may be a case wherein crystallization well proceeds to result in a crystalline polymer. Therefore, even if a polymer is resulted from the same monomer unit, the polymer may become crystalline or amorphous. Accordingly, in the above description, an expression "a unit derived from a monomer which can become an amorphous component" is used.

Here, an expression "a monomer unit" used in the present invention stands for a repeating unit constituting a polymer, which unit is derived from one polyhydric alcohol molecule and one polycarboxylic acid molecule.

When a monomer unit (an ethylene terephthalate unit) consisting of terephthalic acid and ethylene glycol is a main monomer unit constituting a polymer, there are exemplified a monomer unit consisting of isophthalic acid and ethylene glycol, a monomer unit consisting of terephthalic acid and neopentyl glycol, a monomer unit consisting of terephthalic acid and 1,4-cyclohexanedimethanol and a monomer unit consisting of isophthalic acid and butanediol, as the above unit derived from the monomer which can become the amorphous component.

It is preferred that monocarboxylic acid (such as benzoic acid, lactic acid and glycolic acid) as well as tricarboxylic and higher polycarboxylic acid (such as trimellitic acid, pyromellitic acid and anhydride thereof) are not contained in the polyester. In a heat-shrinkable film prepared by using the polyester containing such monocarboxylic acid or polycarboxylic acid, it is difficult to achieve necessary high shrinking rate.

As to a diol component other than the ethylene glycol constituting the polyester of the present invention, there are exemplified an aliphatic diol such as 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol, hexanediol, neopentyl glycol, diethylene glycol and hexanediol, an alicyclic diol such as 1,4-cyclohexanedimethanol and an aromatic diol such as bisphenol A.

It is necessary that the polyester resin for heat-shrinkable film according to the present invention contains neopentyl glycol as a diol component. A content of neopentyl glycol is 18% by mol or more, preferably 19% by mol or more, and more preferably 20% by mol or more when the total amount of the whole diol component is taken as 100% by mol. The content of neopentyl glycol is 32% by mol or less, preferably 30% by mol or less, more preferably 29% by mol or less, and further preferably 28% by mol or less when the total amount of the whole diol component is taken as 100% by mol. Due to its branched structure, neopentyl glycol has a role of lowering the stereoregularity of polymer and enhancing the amorphous property thereof. Particularly when the content of neopentyl glycol is increased, there is such a tendency that the shrinking rate increases. When the content of neopentyl glycol is less than the above range, amorphous component is insufficient whereby the aimed shrinking rare is not achieved while, when the content is more than that, although the aimed shrinking rate can be achieved, the shrinking rate after aging is deteriorated, the shrinking rate at low temperature (70° C.) is deteriorated or the heat resistance is significantly deteriorated.

It is necessary that the polyester resin for heat-shrinkable film according to the present invention contains diethylene glycol as a diol component. A content of diethylene glycol is 8% by mol or more, preferably 9% by mol or more, and more preferably 10% by mol or more when the total amount of the whole diol component is taken as 100% by mol. The content of diethylene glycol is 16% by mol or less, preferably 15% by mol or less, and more preferably 14% by mol or less when the total amount of the whole diol component is taken as 100% by mol. Due to its long-chain hydrocarbon structure, diethylene glycol has a role of imparting flexibility to polymers. As a result of combining diethylene glycol with neopentyl glycol, the stretching stress during stretch of the film lowers whereby deterioration of the shrinking rate at low temperature (70° C.) is suppressed and deterioration of the shrinking rate after aging is also suppressed. When the content of diethylene glycol is less than the above range, the above-mentioned improving effect is small and the aimed quality is not achieved while, when it is more than the above range, no more improving effect is achieved and there are resulted such problems that the heat resistance is significantly deteriorated and that the yellowish tint of the film becomes strong.

It is preferred that the polyester resin does not contain a diol having not less than 8 carbons (such as octanediol) or a monohydric alcohol (such as hydroxy benzoic acid and benzyl alcohol) or a trihydric or higher polyhydric alcohol (such as trimethylolpropane, trimethylolethane, glycerol or diglycerol). In a heat-shrinkable film prepared by using the polyester resin containing such diol or alcohol, it is difficult to achieve necessary high shrinking rate. It is preferred that the polyester resin does not contain triethylene glycol and polyethylene glycol if at all possible. In the polyester resin of the present invention, the amorphous component in 100% by mol of the polyhydric alcohol component and in 100% by mol of the polycarboxylic acid component (i.e., in 200% by mol in total) in the total polyester resin is preferred to be copolymerized. As a result of the copolymerization, there is no anxiety of segregation of raw materials, and it is possible to prevent a change in physical properties of the film due to variations in compositions of the film raw material. Moreover, as a result of the copolymerization, an ester interchange proceeds whereby the amount of amorphous component increases. Accordingly, it is advantageous for increasing the shrinking rate in the main shrinking direction.

If necessary, various additives such as wax, antioxidant, antistatic agent, crystal nucleus agent, viscosity-reducing agent, heat stabilizer, pigment for coloration, coloration preventer or ultraviolet absorber may be added to the polyester resin for heat-shrinkable film of the present invention.

It is preferred that fine particles which make a working property (slipping property) of the film better are added as a lubricant to the polyester resin for heat-shrinkable film of the present invention. Although anything may be selected as the fine particles, examples of the inorganic fine particles include silica, alumina, titanium dioxide, calcium carbonate, kaolin and barium sulfate while examples of the organic fine particles include acrylic resin particles, melamine resin particles, silicone resin particles and cross-linking polystyrene particles. An average particle size of the fine particles may be appropriately selected upon necessity from a range of 0.05 to 3.0 μm (in case of being measured using a Coulter counter). For example, when the fine particles are silica, it is possible to adjust the average particle size of the fine particles to the above range in case a content thereof is 50 ppm to 3000 ppm. The content of silica is preferred to be 200 ppm or more, and more preferred to be 300 ppm or more. When the content of silica is too much, transparency is deteriorated. Therefore, in a film which requires transparency, the content of silica is preferred to be 2000 ppm or less and more preferred to be 1500 ppm or less.

As to a method of compounding the above particles with the polyester resin for heat-shrinkable film, although it is possible, for example, to add them in any of stages of producing the polyester resin, it is preferred that the particles are added as a slurry being dispersed in ethylene glycol or the like in a stage of esterification or in a stage after completion of ester interchange and before starting polycondensation reaction followed by proceeding the polycondensation. It is also preferred to conduct it, for example, by a method wherein a slurry of the particles dispersed in ethylene glycol, water or the like is blended with the polyester resin raw materials by using a kneading extruder equipped with a vent or by a method wherein the dried particles and the polyester resin raw materials are blended by using a kneading extruder.

It is also possible that the heat-shrinkable film of the present invention is subjected to a corona treatment, a coating treatment or a flame treatment for improving adhesive property of the film surface.

Now, characteristic properties of the polyester resin and of the heat-shrinkable film according to the present invention will be described.

It is necessary that the polyester resin according to the present invention has an intrinsic viscosity (IV) of from 0.70 to 0.86 dl/g, and preferably from 0.70 to 0.84 dl/g. When the raw material having the intrinsic viscosity within this range is combined with a melt extrusion condition which will be mentioned later, it is now possible to adjust the intrinsic viscosity of the heat-shrinkable film within a range of from 0.60 dl/g to 0.74 dl/g. When the intrinsic viscosity (IV) of the polyester resin is less than the above range, viscosity of the resin becomes low whereby a drawdown during the film preparation becomes large and the film preparation itself becomes difficult. In addition, strength of the resulting film becomes weak and the aimed quality cannot be achieved. When the intrinsic viscosity (IV) exceeds the above range, the decomposition reaction also proceeds together with the melt polymerization whereby increase in the viscosity is not achieved any more. Further, in view of a stirring ability of a polymerization equipment, an upper limit of the intrinsic viscosity (IV) is about 0.86 dl/g. The polyester resin of the present invention is an amorphous polymer wherein crystallization hardly proceeds. Accordingly, it cannot assume a crystalline state or, even if crystallized, its degree of crystallization is very low. Accordingly, its melting point (an endothermic peak by melting in the measurement using a DSC differential scanning calorimetric analysis device) is not clear. Therefore, it is difficult to conduct a solid-phase polycondensation (solid-phase polymerization) at a temperature of not higher than the melting point of the polyester resin. In view of such a point as well, the upper limit of the intrinsic viscosity (IV) the polyester resin of the present invention is about 0.86 dl/g.

In addition, it is necessary that the carboxyl end group concentration (AV) of the polyester resin of the present invention is from 8 to 25 eq/t, preferably from 9 to 25 eq/t, and more preferably from 9 to 20 eq/t. When the polyester resin of the present invention is extruded at a temperature of as high as not lower than 200° C., deterioration reactions such as hydrolysis, thermal decomposition and oxidative decomposition proceed resulting in a lowering in a polymerization degree, a decrease in a weight, a worsening of a color tone, etc. Particularly, a moisture (including a trace of moisture being contained in the polyester resin after drying, and a trace of moisture with which the polyester resin contacts in the film preparation step and the material-recycling step) advances the hydrolysis using a proton of the carboxyl end group concentration (AV) of the polyester resin as a catalyst, and advances the decomposition in more significant velocity than in other deterioration reactions. Therefore, it is necessary that the carboxyl end group concentration (AV) of the polyester resin of the present invention is set to be within the above range. Although a lower limit of the carboxyl end group concentration (AV) is not particularly limited, it is about 8 eq/t or so in view of the decomposition reaction in the polycondensation reaction of the resin. Further, when the carboxyl end group concentration (AV) exceeds the above range, the decomposition reaction is promoted during the film preparation and extrusion even when the intrinsic viscosity (IV) is within the above range whereby the intrinsic viscosity (IV) greatly lowers and the drawdown during the film preparation becomes large. As a result, the film preparation itself becomes difficult. Furthermore, the strength of the resulting film also becomes weak and the aimed quality cannot be achieved. Since the carboxyl end group concentration (AV) of the resulting film also increases, the recovered raw material obtained from the material recycle also becomes in a high AV whereby it is not possible to add the recovered raw material to the raw material at a high rate.

It is also necessary that the color b value in the L*a*B color system of the polyester resin of the present invention is from 1.0 to 12.0, and preferably from 2.0 to 11.0. When the color b value is lower than above range, bluish tint of the resulting film becomes strong while, when it exceeds the above range, yellowish tint of the resulting film becomes strong. Therefore, the recovered raw material also shows the same color tone whereby it is no longer possible to add the recovered raw material to the raw material at a high rate.

The polyester resin of the present invention may be prepared by any of a direct esterification reaction using terephthalic acid as a raw material and a transesterification reaction using dimethyl terephthalate as a raw material of a terephthalic acid component.

A production process for the polyester resin of the present invention is classified into a continuous method and a batch method, depending on a supply mode of the raw material or an extrusion mode of the polymer. The polyester resin of the present invention can be produced by any of those methods. In the present invention, a continuous method is preferred in view of high stability of productivity and of product quality. In the continuous method, the raw material is continuously supplied whereby the esterification reaction is conducted continuously and the polycondensation thereafter is also conducted continuously. In any of those methods, the esterification reaction may be conducted in a single step or may be conducted dividedly in multiple steps. The melt polycondensation reaction may also be conducted in a single step or may be conducted dividedly in multiple steps.

An example of the method for polymerizing the polyester resin according to the present invention is as follows. Thus, neopentyl glycol and diethylene glycol are mixed with the above dicarboxylic acid component containing terephthalic acid as a main component and the above diol component containing ethylene glycol as a main component in a raw material mixing tank whereupon a slurry is prepared. This slurry is supplied to an esterification reaction tank. A temperature for the esterification reaction is usually set at 220 to 260° C., and preferably 230 to 250° C. while pressure in the reaction can is usually set at 0.2 to 0.4 MPa and preferably 0.25 to 0.35 MPa and the esterification reaction is conducted with stirring usually for 2 to 5 hours and preferably 2.5 to 4 hours. The resulting esterification reaction product (oligomer) is transferred to a polycondensation reaction tank.

Polycondensation is conducted with stirring usually at 240 to 290° C., preferably at 250 to 280° C., and more preferably at 260 to 275° C. usually within 5 hours, preferably within 4 hours, and more preferably within 3 hours wherein a final degree of vacuum in the reaction can is usually 10 kPa or lower, preferably 5 kPa or lower, and more preferably 1 kPa or lower. As a result thereof, the aimed degree of polymerization is achieved. The degree of polymerization is controlled by a torque needed for the stirring of the polymer. At a point wherein the desired stirring torque is achieved, an inner area of the reaction can is purged with nitrogen to return to an ordinary pressure whereby the polycondensation is ceased. The resulting polymer is usually transferred to a die from a bottom of the polycondensation reaction tank, drawn out into strands, cut with a cutter together with or after cooling using water and made into particles such as pellets or chips.

As to a polymerization catalyst for the polyester resin of the present invention, there may be used at least one member selected from antimony compound, germanium compound, titanium compound and aluminum compound. As to the above antimony compound, there are exemplified antimony trioxide, antimony pentoxide, antimony acetate and antimony glycoxide. Among those compounds, antimony trioxide is preferred. A content of the antimony compound as such is preferably 50 to 400 ppm and more preferably 100 to 350 ppm to the polyester resin.

As to the above germanium compound, there are exemplified crystalline germanium dioxide, amorphous germanium dioxide, germanium tetraoxide, germanium hydroxide, germanium oxalate, germanium chloride, germanium tetraethoxide, germanium tetra-n-butoxide and germanium phosphite. Among those compounds, crystalline germanium dioxide and amorphous germanium dioxide are preferred. A content of the germanium compound as such is preferably 10 to 100 ppm and more preferably 30 to 80 ppm to the polyester resin.

As to the above titanium compound, there are exemplified tetraalkyl titanate (such as tetraethyl titanate, tetraisopropyl titanate, tetra-n-propyl titanate and tetra-n-butyl titanate) and partially hydrolyzed products thereof, titanium acetate, titanyl oxalate compound (such as titanyl oxalate, ammonium titanyl oxalate, sodium titanyl oxalate, potassium titanyl oxalate, calcium titanyl oxalate and strontium titanyl oxalate), titanium trimellitate, titanium sulfate, titanium chloride, hydrolyzed product of titanium halide, titanium bromide, titanium fluoride, potassium hexafluorotitanate, ammonium hexafluorotitanate, cobalt hexafluorotitanate, manganese hexafluorotitanate, titanium acetylacetonate, titanium complex with hydroxypolycarboxylic acid or with nitrogen-containing polycarboxylic acid, complex oxide consisting of titanium and silicon or zirconium, and a reaction product of titanium alkoxide with phosphorus compound. Among the above, preferred ones are titanium tetraisopropoxide, titanium tetrabutoxide and potassium titanyl oxalate. A content of the titanium compound as such is preferably 5 to 50 ppm and more preferably 10 to 40 ppm to the polyester resin.

As to the above aluminum compound, there are exemplified carboxylate (such as aluminum formate, aluminum acetate, aluminum propionate and aluminum oxalate), oxide, inorganic acid salt (such as aluminum hydroxide, aluminum chloride, aluminum hydroxide chloride and aluminum carbonate), aluminum alkoxide (such as aluminum methoxide and aluminum ethoxide), aluminum acetylacetonate, aluminum chelate compound with aluminum acetylacetonate or the like, organic aluminum compound (such as trimethyl aluminum and triethyl aluminum) and partially hydrolyzed products thereof. Among them, preferred ones are aluminum acetate, aluminum chloride, aluminum hydroxide, aluminum hydroxide chloride and aluminum acethylacetonate. A content of the aluminum compound as such is preferably 10 to 100 ppm and more preferably 20 to 60 ppm to the polyester resin.

Further, it is desirable to use a phosphorus compound as a stabilizer for suppressing an increase of the carboxyl end group concentration (AV). As to the phosphorus compound, there are exemplified phosphoric acid, phosphorous acid, phosphonic acid and derivatives thereof. As to the preferred specific examples thereof, there are phosphoric acid, trimethyl phosphate, tributyl phosphate, triphenyl phosphate, monomethyl phosphate, dimethyl phosphate, monobutyl phosphate, dibutyl phosphate, phosphorous acid, trimethyl phosphite, tributyl phosphite, methyl phosphonate, dimethyl methylphosphonate, dimethyl ethylphosphonate, dimethyl phenylphosphonate, diethyl phenylphosphonate and diphenyl phenylphosphonate. Among them, trimethyl phosphate and phosphoric acid are particularly suitable. A content of the phosphorus compound as such is preferably 40 to 200 ppm, more preferably 60 to 170 ppm, and especially preferably 70 to 150 ppm to the polyester resin. When the content of phosphorus in the polyester resin is less than the above range, thermostability of the polyester resin is deteriorated whereby the carboxyl end group concentration (AV) may increase or the color tone becomes bad during the polycondensation. When the content of phosphorus is more than the above range, foreign matters containing phosphorus compounds as main components are generated whereby clogging of a filter is induced during the polymer polymerization step and the film preparation step or quality of the film is deteriorated even if an increase in the carboxyl end group concentration (AV) can be suppressed.

In the production of a polyester resin according to the present invention, either an alkali metal compound or an alkali earth metal compound may also be used. As to the alkali metal compound or the alkali earth metal compound, there are exemplified carboxylate, alkoxide, etc. of the element such as an acetate. They are added to the reaction system as powder, aqueous solution, ethylene glycol solution or the like.

For improving the color tone of the copolymerized polyester, a cobalt compound may be compounded therewith. As a result of addition of such cobalt compound, the color b value can be particularly made small. As to the cobalt compound, there are exemplified cobalt acetate, cobalt chloride, cobalt benzoate and cobalt chromate. Among them, cobalt acetate is preferred. A content of the cobalt compound as such is preferably 1 to 30 ppm, more preferably 3 to 20 ppm, and especially preferably 5 to 15 ppm to the polyester resin. When the content of cobalt in the polyester resin is less than the above range, yellowish tint of the polyester resin becomes strong while, when it is more than the above range, the polyester resin becomes dark or bluish tint becomes strong due to a reduction of cobalt metal whereby a commercial value lowers.

The above metal compound may be added before starting the esterification reaction or during any time between after finishing the pressurized esterification reaction and before starting the initial polycondensation reaction. However, when the antimony compound or the titanium compound is used as the polycondensation catalyst, it is preferable to add the above metal compound before the esterification reaction. It is also preferable to add other polycondensation catalyst, thermostabilizer and additive after the esterification reaction.

In preparation of the polyester resin of the present invention, when the above phosphorus compound is contained, it is possible to enhance the stability. In addition thereto, when an end composition of an oligomer before the polycondensation reaction is adjusted, it is possible to adjust the polycondensation rate, the carboxyl end group concentration (AV) in the polyester resin after the polymerization and the color b value. When a ratio occupied by a hydroxyl end group concentration (OH) in total end numbers of the oligomer before the polymerization reaction is controlled to be 90% or more, it is now possible to efficiently proceed with the polycondensation reaction and the ratio of the hydroxyl end group concentration (OH) in the polyester resin after the polymerization becomes also high whereby the carboxyl end group concentration (AV) can become low. When the ratio occupied by the hydroxyl end group concentration (OH) is controlled to be less than 90%, the polycondensation reaction rate lowers and the polycondensation reaction time becomes long whereby the color b value becomes high. Further, the ratio of the hydroxyl end group concentration (OH) in the polyester resin after the polymerization also becomes low whereby the carboxyl end group concentration (AV) also becomes high.

In order to control the ratio of the hydroxyl end group concentration (OH) in the oligomer to be 90% or more, it is preferable to adjust G/T (molar ratio of glycol to terephthalic acid) in preparing a raw material slurry to 1.6-2.5, more preferably to 1.7-2.2. When the ratio is less than the above range, not only the ratio of the hydroxyl end group concentration (OH) in the resulting oligomer becomes low but also the esterification reaction rate becomes slow whereby the time for the esterification reaction time becomes long. In addition, when G/T is larger than the above range, although there is no problem in terms of the hydroxyl end group concentration (OH) in the resulting oligomer and also in terms of the esterification reaction rate, glycol which is not used for the polycondensation reaction is excessively produced and that is not preferred in view of economy as well.

It is preferred that the polyester resin according to the present invention has a melt viscosity of 200 Pa·S or less, when measured at a shear rate of 6080/S at 250° C. When the melt viscosity is high, extrusion becomes difficult unless a resin temperature is increased. In the raw material as in the present invention which contains diethylene glycol abundantly, foreign matters in a film and a sheet after extrusion become abundant when the resin temperature during the extrusion is high whereby it is not preferred. Accordingly, the resin temperature during the extrusion is preferred to be 245° C. or low and more preferred to be 240° C. or low. A lower limit of the resin temperature during the extrusion is a melting point of the raw material. However, the melting point is not clear in the raw material of the present invention and, at 210° C., melting takes place. Accordingly, 210° C. shall be made as the lower limit of the resin temperature during the extrusion. Further, when the melt viscosity measured at 250° C. is 200 Pa·S or more, a load of a machine used for melt extrusion of the raw material becomes high and size of facilities becomes big whereby it is not preferred. The melt viscosity is preferred to be 190 Pa·S or less and more preferred to be 180 Pa·S or less. Furthermore, when the melt viscosity is too low, shearing stress at a discharge part of the melted resin becomes low resulting in the unevenness in thickness whereby it is not preferred. The melt viscosity measured at 250° C. is preferred to be 100 Pa·S or more, and more preferred to be 110 Pa·S or more.

When the heat-shrinkable film of the present invention is made into a film of 40 μm thickness, it is preferable that a number of defect in 1 mm size or more in the lengthwise direction of the film or in the widthwise direction of the film is more than 1.5 per 10 square meters of the film. When the number of defect is large, a part of the defect (foreign substance) results in an omission of ink upon printing and an appearance of a label after printing is deteriorated whereby it is not preferred. The number of the defect in the lengthwise direction of the film or in the widthwise direction of the film is preferred to be 1 or less and more preferred to be 0.5 or less per 10 square meters of the film.

When the heat-shrinkable film of the present invention is immersed for 10 seconds in hot water of 98° C. under an unloaded state for shrinkage and is then immediately immersed for 10 seconds in water of 25° C.±0.5° C. to stop the shrinkage, the heat-shrinking rate (i.e., a heat-shrinking rate in hot water of 98° C.) in the widthwise direction (in the main shrinking direction) of the film is preferred to be from 60% to 85%, wherein the heat-shrinking rate is calculated by the following formula 1 from lengths before and after the shrinking. The heat-shrinking rate in hot water at 98° C. is more preferred to be 63% or more, and further preferred to be 66% or more. Incidentally, a demand is low for a film which has the heat-shrinking rate in hot water of 98° C. in the main shrinking direction of more than 85%, an upper limit of the heat-shrinking rate in hot water is set to be 85%.

Heat-shrinking rate (%)={[(Length before shrinking)−(Length after shrinking)]/(Length before shrinking)}×100    formula (1)

When the heat-shrinking rate in hot water at 98° C. in the main shrinking direction is less than the above range, it is impossible to deal with a demand for a highly shrinking film covering the whole container (so-called full label). Moreover, when the film is used as a label, strain, insufficient shrinking, wrinkle, slack, etc. may occur in the label after the heat-shrinking due to small shrinking amount.

Further, in the heat-shrinkable film of the present invention, the heat-shrinking rate in hot water of 98° C. in the direction being orthogonal to the main shrinking direction of the film (the lengthwise direction) being measured in the same manner as above is preferred to be from −5% to 10%. The heat-shrinking rate in hot water at 98° C. in the orthogonal direction to the main shrinking direction is more preferred to be 8% or less, and further preferred to be 6% or less. When the heat-shrinking rate in hot water at 98° C. in the orthogonal direction to the main shrinking direction is less than the above range, a stretched length of the film by heating is too much and, in a use as a label for a container, no good shrunk appearance can be resulted whereby it is not preferred. On the contrary, when the heat-shrinking rate in hot water of 98° C. in the orthogonal direction to the main shrinking direction is more than the above range, the label after the heat-shrinking becomes short (i.e. a height of the label decreases) and the label area becomes small whereby it is not preferred as the full label. Also, strain is apt to occur in the label after the heat-shrinking whereby it is not preferred.

Incidentally, when the heat-shrinking rate in hot water of 98° C. in the orthogonal direction to the main shrinking direction is less than −5%, the height of a label after shrinking becomes high and, as a result, an excessive part is in a state of overabundance causing the winkles whereby a lower limit is set to be −5%.

In the heat-shrinkable film of the present invention, it is preferred that the maximum shrinking stress measured under hot air of 90° C. is 2 MPa to 7 MPa in the main shrinking direction of the film and that a shrinking stress after 30 seconds from a start of the measurement of shrinking stress is from 60% to 100% of the maximum shrinking stress. The maximum shrinking stress at 90° C. is more preferred to be 6 MPa or less and further preferred to be 5 MPa or less. Also, the maximum shrinking stress at 90° C. is more preferred to be 2.5 MPa or more and further preferred to be 3 MPa or more. Incidentally, measurement of the shrinking stress is carried out by the method mentioned in Examples.

When the maximum shrinking stress at 90° C. in the main shrinking direction of the film is more than the above range, although there is no problem therein in a case of containers of PET bottles, crash by the shrinking stress occurs during the shrinking in a case of containers having a thin thickness whereby it is not preferred. When the maximum shrinking stress at 90° C. in the main shrinking direction of the film is less than the above range, in a use as a label for a container, there are some cases wherein the label becomes loose and does not tightly adhere to the container whereby it is not preferred.

When the heat-shrinkable film of the present invention is immersed for 10 seconds in hot water of 70° C. under an unloaded state for shrinkage and is then immediately immersed for 10 seconds in water of 25° C.±0.5° C. to stop the shrinkage, the heat-shrinking rate (i.e., a heat-shrinking rate in hot water of 70° C.) in the widthwise direction (in the main shrinking direction) of the film is preferred to be from 25% to 50%, wherein the heat-shrinking rate is calculated by the above formula 1 from lengths before and after the shrinking. The heat-shrinking rate in hot water at 70° C. is more preferred to be 30% or more, and further preferred to be 35% or more. When the heat-shrinking rate in hot water at 70° C. in the main shrinking direction is less than the above range, in a use as a label, strain, insufficient shrinking, wrinkle, slack, etc. may occur in the label after the heat-shrinking due to small shrinking amount when the label is shrunk with a device which uses a hot air as a heat source. Incidentally, a demand is low for a film which has the heat-shrinking rate in hot water of 70° C. in the main shrinking direction of more than 50%, an upper limit of the heat-shrinking rate in hot water is set to be 50%.

In the heat-shrinkable film of the present invention, it is preferred that the difference between a heat-shrinking rate in hot water when the film which has not been subjected to any aging treatment is immersed for 10 seconds in hot water of 70° C. and a heat-shrinking rate in hot water when the film which has been subjected to an aging treatment for 672 hours in an atmosphere of 40° C. temperature and 65% relative humidity is immersed for 10 seconds in hot water of 70° C. is from 0% to 5% (following formula (2)). The difference in the shrinking rates in hot water is more preferred to be 4% or less, and further preferred to be 3% or less. When the difference in the shrinking rates in hot water of 70° C. before and after the aging is big, temperature conditions during the step wherein the film is shrunk into a label are different before and after the aging whereby it is not preferred. Particularly when the films before and after the aging are used in a mixed manner depending upon a stockpile state, appearances of the finish after shrinking are different if the heat-shrinking is conducted in an industrially continuous manner whereby it is not preferred. Incidentally, the most desirable outcome is that the difference in the heat-shrinking rates in hot water does not change before and after the aging. This is why the lower limit is set to be 0%.

Difference in heat-shrinking rates(%)=(Shrinking rate in hot water before aging)−(Shrinking rate in hot water after aging)      formula (2)

In the heat-shrinkable film of the present invention, it is preferred that, after the film has been subjected to the aging treatment for 672 hours in an atmosphere of 40° C. temperature and 65% relative humidity, a natural shrinking rate calculated by the following formula (3) is from 0.1% to 0.6% in the main shrinking direction of the film. The natural shrinking rate is more preferred to be 0.5% or less and further preferred to be 0.4% or less. When the natural shrinking rate in the main shrinking direction (in the widthwise direction of the film) is higher than the above range, there is a possibility that a width of a rolled product of the film decreases and the width does not match in the processing stage such as printing. Incidentally, although the natural shrinking rate is most preferred to be 0%, only to an extent of 0.1% could be actually achieved in the present invention whereby the lower limit is set to be 0.1%.

Natural shrinking rate(%)={[(Length after aging)−(Length before aging)]/(Length before aging)}×100      formula (3)

In the heat-shrinkable film of the present invention, it is preferred that, after the film has been subjected to the aging treatment for 672 hours in an atmosphere of 40° C. temperature and 65% relative humidity, a tensile elongation at break is 30% or more in the orthogonal direction to the main shrinking direction of the film (lengthwise direction). The tensile elongation at break is more preferred to be 40% or more, and further preferred to be 50% or more. When the tensile elongation at break is less than the above range, there is a possibility that the film is torn due to a tension in the lengthwise direction being loaded upon the printing or processing of the rolled product.

In the heat-shrinkable film of the present invention, its thickness is preferred to be from 10 μm to 50 μm although there is no particular limitation therefor. More preferred lower limit for the thickness is 15 μm.

The heat-shrinkable film of the present invention can be prepared in such a manner that the polyester resin of the present invention is subjected to a melt extrusion using an extruder, and then the resulting non-stretched film is subjected to a stretching in the widthwise direction. Incidentally, the polyester resin can be prepared by polycondensation of the above-mentioned suitable dicarboxylic acid component and diol component by a known method. Usually, polyester in chips is used as a raw material for the film.

In subjecting the polyester resin to the melt extrusion, it is preferred that the polyester resin is dried in advance using a drier such as a hopper drier or a paddle drier or using a vacuum drier. After the polyester resin is dried as such, it is melted at a temperature of 230 to 270° C. using the extruder and is extruded into a film. In conducting such extrusion, it is possible to adopt any of known methods such as a T die method or a tubular method.

When the melted resin in a sheet form after the extrusion is quickly cooled, a non-stretched film can be prepared. As to a method for quick cooling of the melted resin, there may adopted a method wherein the melted resin is cast onto a rotating drum from mouthpieces to quickly solidify whereupon a substantially non-orientated resin sheet is prepared.

(Lateral Stretching and Relax after the Lateral Stretching)

When the following methods (1) and (2) are adopted, properties of the polyester resin of the present invention can be expressed more advantageously whereby it is preferred.

(1) Control of Conditions for the Lateral Stretching

In the lateral stretching, the film is previously heated at a temperature of from (Tg+10° C.) to (Tg+25° C.) under such a state that both ends of the film in the widthwise direction are held by clips in a tenter. After that, it is preferred to stretch to an extent of from 3.5 times to 6 times in the widthwise direction together with cooling so as to decrease the temperature to a range from (Tg−5° C.) to (Tg+9° C.). As a result of stretching in the widthwise direction together with cooling, a value of stress ratio [(tensile stress upon final stretching)/(upper yield point stress)] of a stress-strain curve becomes high and it is now possible to decrease the unevenness in thickness in the widthwise direction. After the lateral stretching, it is preferred to subject the film to a heat treatment at a temperature of from (the stretching temperature+1° C.) to (the stretching temperature+10° C.). When the heat treatment temperature is lower than the stretching temperature, a relaxation of a molecular orientation is insufficient and the natural shrinking rate becomes high whereby it is not preferred. When the heat treatment temperature is higher than (the stretching temperature+10° C.), the shrinking rate in the widthwise direction lowers whereby it is not preferred.

(2) Relax in the Widthwise Direction after the Lateral Stretching

In the heat treatment step, it is preferred to relax to an extent of from 0% to 5% in the widthwise direction (0% is without relax) under such a state wherein both ends of the film in the widthwise direction are held by clips in a tenter. As a result of conducting the relax, the shrinking rate in the widthwise direction somewhat lowers but the molecular orientation is subjected to relaxation in the widthwise direction and it is now possible to lower the shrinking stress and the natural shrinking rate. In addition, as a result of conducting the heat treatment at a temperature higher than the stretching temperature in the final heat treatment step, the molecular orientation is subjected to relaxation and it is now possible to lower the shrinking stress and the natural shrinking rate.

The heat-shrinkable label of the present invention is formed using the heat-shrinkable film of the present invention. The packaged product of the present invention is formed in such a manner that the heat-shrinkable label having perforations or notches prepared from the heat-shrinkable film of the present invention is coated at least on a part of an outer periphery of a target to be packaged followed by subjecting to a heat-shrinking treatment. Examples of the target to be packaged include PET bottles for beverages; various kinds of bottles and cans; plastic containers for confectionery, lunch box, etc.; and boxes made of paper. It is common that, when the target to be packaged is coated by means of heat-shrinking of the label prepared by the heat-shrinkable film, the label is subjected to heat-shrinking to an extent of about 5 to 70% and is closely adhered to the target to be packaged. Incidentally, the label for coating the target to be packaged may be either with print or without print.

With regard to a method for preparing the heat-shrinkable label from the heat-shrinkable film of the present invention, there are a method wherein an organic solvent is applied to an area which is a bit inside from an end of one side of a rectangular film, the film is then immediately made round and the ends thereof are layered and adhered to make into a label, and a method wherein an organic solvent is applied to an area which is a bit inside from an end of one side of a wound film in a roll shape, the film is then immediately made round and the ends thereof are layered and adhered and the resulting tube-shaped one is cut into a label. As to the organic solvent for the adhesion, it is preferred to use a cyclic ether such as 1,3-dioxorane or tetrahydrofuran. Besides the above, it is also possible to use an aromatic hydrocarbon such as benzene, toluene, xylene or trimethylbenzene; a halogenated hydrocarbon such as methylene chloride or chloroform; a phenol compound such as phenol; and a mixture thereof.

EXAMPLES

The present invention will now be more specifically illustrated by way of Examples and Comparative Examples although the present invention is never limited to the embodiments of such Examples but may be appropriately modified within a scope of the gist of the present invention.

Incidentally, evaluations of each characteristic property data were done in accordance with the following methods.

Method for Measuring the Carboxyl End Group Concentration in Oligomer (OLG-AV)

The oligomer (0.2 g) was precisely weighed and dissolved in 20 mL of chloroform. It was titrated in a 0.1N ethanolic solution of potassium hydroxide using phenolphthalein as an indicator. An equivalent (unit: eq/ton) per 1 ton of the resin was determined.

Method for Measuring the Hydroxyl End Group Concentration in Oligomer (OLG-OHV)

The oligomer (0.5 g) was precisely weighed, 10 mL of an acetylating agent (0.5 mol/L solution of acetic anhydride in pyridine) was added thereto and the mixture was immersed for 90 minutes in a water tank of 95° C. or higher. Immediately after it was taken out from the water tank, 10 mL of pure water was added thereto and the mixture was allowed to cool until room temperature. It was then titrated in a 0.2N methanolic solution of sodium hydroxide using phenolphthalein as an indicator. In accordance with a common method, the hydroxyl group was calculated using the above value of the carboxyl group (unit: eq/ton).

Calculation of the Ratio of Hydroxyl Group in the Oligomer (OLG-OH %)

The ratio of the hydroxyl group was calculated according to the following formula 4 from the carboxyl group and the hydroxyl group determined by the above method. In the following formula 4, a sum of the hydroxyl group and the carboxyl group is considered as a total number of the oligomer end.

Ratio of hydroxyl group={(Hydroxyl group)/[(Hydroxyl group)+(Carboxyl group)]}×100    formula (4)

Method for Analyzing the Composition of the Polyester Resin

A sample (5 mg) was dissolved in 0.6 ml of a mixed solution of heavy chloroform and trifluoroacetic acid (ratio by volume: 9/1). Copolymerized ratios with terephthalic acid, ethylene glycol, neopentyl glycol and diethylene glycol were determined using $^1$H-NMR (UNITY 50 manufactured by Variant).

Content of Antimony in the Polyester Resin

A sample (1 g) was subjected to wet decomposition by a mixed liquid of sulfuric acid with an aqueous solution of hydrogen peroxide. After that, sodium nitrite was added thereto so as to change an antimony atom to $Sb^{+5}$ followed by adding Brilliant Green thereto whereby a blue complex with antimony was formed. This complex was extracted with toluene. Absorbance thereof at 620 nm wavelength was measured using an absorptiometer (UV-150-02 manufactured by Shimadzu). Amount of atomic antimony in the sample was determined by colorimetry using a previously-prepared calibration curve.

Content of Phosphorus in the Polyester Resin

A phosphoric compound in a sample (1 g) was changed to orthophosphoric acid either by a method wherein the sample was subjected to a dry incineration in the co-presence of sodium carbonate or by a method wherein the sample was subjected to a wet decomposition by a mixed liquid of sulfuric acid/nitric acid/perchloric acid or by a mixed liquid of sulfuric acid/aqueous solution of hydrogen peroxide. After that, orthophosphoric acid was reacted with a molybdate in 1 mol/L sulfuric acid solution to as to make into phosphomolybdic acid followed by reducing with hydrazine sulfate whereupon heteropoly blue was prepared. Absorbance thereof at 830 nm wavelength was measured using an absorptiometer (UV-150-02 manufactured by Shimadzu). Amount of atomic phosphorus in the sample was determined by using a previously-prepared calibration curve.

Content of Cobalt in the Polyester Resin

A sample (1 g) was subjected to incineration using a platinum crucible and 6 mol/L hydrochloric acid was added thereto followed by evaporating to dryness. This was dissolved in 1.2 mol/L hydrochloric acid. An intensity of luminescence was measured using an ICP emission spectroscopic analysis apparatus (ICPS-2000 manufactured by Shimadzu). Amount of atomic cobalt in the sample was determined by using a previously-prepared calibration curve.

Method for Measuring the Intrinsic Viscosity (IV) of the Polyester Resin

A sample (1.0 g) being dried at 60° C. for 24 hours was precisely weighed and dissolved in a mixed solvent of 25 mL of phenol/tetrachloroethane (in a ratio of 3/2 by mass). Its intrinsic viscosity was measured at 30° C. using an Ostwald viscometer.

Method for Measuring the Carboxyl End Group Concentration (AV) in the Polyester Resin A sample (0.2 g) being dried at 60° C. for 24 hours was precisely weighed and its weight at that time was set to be W (g). To a test tube were added 10 ml of benzyl alcohol and the weighed sample, the test tube was then dipped in an oil bath heated at 205° C. and the sample was dissolved therein together with stirring with a glass rod. The sample wherein a dissolving time was set to be 3 minutes, 5 minutes or 7 minutes was referred to as A, B or C, respectively. After that, a test tube was newly prepared, only benzyl alcohol was placed therein and treated under the same process. The sample wherein the dissolving time was set to be 3 minutes, 5 minutes or 7 minutes was referred to as a, b or c, respectively. Titration was conducted using a 0.04 mol/l solution of potassium hydroxide (an ethanolic solution), a factor of which was known already. Phenol Red was used as an indicator. A point wherein a color changed from yellowish green to pink was adopted as an end point, and a titrated amount (ml) of the potassium hydroxide solution was determined. Titrated amounts for the samples A, B and C were referred to as XA, XB and XC (ml), respectively. Titrated amounts for the samples a, b and c were referred to as Xa, Xb and Xc (ml), respectively. The titrated amount V (ml) wherein the dissolving time was 0 minute was determined by a least-squares method using the titrated amount XA, XB or XC for each dissolving time. Similarly, the titrate amount V0 (ml) was determined using Xa, Xb or Xc. After that, AV was determined in accordance with the following formula 5.

$AV(eq/t)=[(V-V0) \times NF \times 1000]/W$    formula (5)

NF: factor of 0.04 mol/1 potassium hydroxide solution
W: weight of sample (g)

Method for Measuring the Color b Value of the Polyester Resin

The color b value was measured using a colorimetric color-difference meter (ZE-6000 manufactured by Nippon Denshoku) from the tristimulus values XYZ expressing the basic stimulation values of the color. The higher the value, the stronger the yellowish tint.

Method for Measuring the Glass Transition Point (Tg) of the Polyester Resin

A temperature of the sample (5 mg) was raised from −40° C. to 120° C. at a raising speed of 10° C. per minute, by using a differential scanning calorimeter (type: DSC220; manufactured by Seiko Electronic Industry). The glass transition point was determined from the resulting endothermic curve. Specifically, a temperature of a crossing point of an extended line of a base line being under the glass transition temperature to a tangent showing a maximum inclination in a transition part was defined as the glass transition temperature (Tg).

Evaluation of a Recycling Property of the Polyester Resin (LPM Extrusion)

A polyester resin being dried at 60° C. for 24 hours was poured into a portable kneader (Labo Plastmill 20C200 manufactured by Toyo Seiki) which was previously heated at 280° C., and kneaded for 2 minutes at 60 rpm. After taking out the resin therefrom, it was cut into chips and subjected to the measurement of IV, AV and color b value by the same method as mentioned hereinabove. When the polyester resin satisfied such requirements that ΔIV was −0.12 dl/g or more, ΔAV was 14 eq/t or less and Δ(color b value) was 4.0 or less, it was judged that the recycling property was good (expressed as "o"). When the polyester resin did not satisfy the above requirements, it was judged that the recycling property was bad (expressed as "x"). A thermal hysteresis in this evaluation corresponds to a thermal hysteresis in the film preparation. When the recycling property is judged to be good, it is believed that a waste film consisting of such polyester resin can be recycled.

Heat-Shrinking Rate (Heat-Shrinking Rate in Hot Water) Before the Aging

A film was cut into squares each being in a size of 10 cm×10 cm to make a film sample. Then, the sample was immersed for 10 seconds under an unloaded state in hot water of (predetermined temperature)±0.5° C. for heat-shrinkage, and was then immediately immersed for 10 seconds in water of 25° C.±0.5° C. to stop the shrinkage. After the sample was taken out from water, sizes of the film in longitudinal and lateral directions were measured and the heat-shrinking rate was determined according to the following formula (6).

Heat-shrinking rate(%)={[(Length before shrinking)−(Length after shrinking)]/(Length before shrinking)}×100  formula (6)

Heat-Shrinking Rate after the Aging

A film was aged for 672 hours in a chamber for environmental test wherein temperature was 40° C. and humidity was 65%. Then, similar to the measurement of the above heat-shrinking rate, sizes of the film in longitudinal and lateral directions were measured and the heat-shrinking rate after the aging was determined according to the above formula.

Difference in the heat-shrinking rates before and after the aging

Difference in the heat-shrinking rates before and after the aging was determined according to the following formula (7).

Difference in heat-shrinking rates(%)=(Heat-shrinking rate in hot water before aging)−(Heat-shrinking rate in hot water after aging)  formula (7)

Natural shrinking rate Marker lines were drawn on a film so as to make a distance between them 200 mm. After that, the distance (mm) between the marker lines was read to 1 decimal place. After that, the film was aged for 672 hours in a chamber for environmental test wherein temperature was 40° C. and humidity was 65%. After that, the distance between the marker lines was read similarly. Natural shrinking rate was determined according to the following formula (8).

Natural shrinking rate(%)={[(Length after aging)−(Length before aging)]/(Length before aging)}×100  formula (8)

Tensile Elongation at Break

The film was aged for 672 hours in a chamber for environmental test wherein temperature was 40° C. and humidity was 65%. After that, a film sample in a rectangular shape was cut out so that the film sample has a length in the lengthwise direction of the film of 140 mm and a length in the orthogonal direction to the measurement direction (in the widthwise direction of the film) of 20 mm. Both ends of the film sample were held in such a manner that each one end was held to an extent of 20 mm by each chuck (a distance between the chucks: 100 mm) using a universal tensile tester "DSS-100" (manufactured by Shimadzu). A tensile test was conducted under conditions wherein environmental temperature was 23° C. and tensile velocity was 200 mm/min. An elongation upon a tensile break was adopted as the tensile elongation at break.

Shrinking Stress

A film sample in a rectangular shape having a length in the main shrinking direction (in the widthwise direction) of 200 mm and a width of 20 mm was cut out from a film. The shrinking stress of this sample was measured using a measuring machine for strength and elongation (Tesilon Universal Tester PTM-250; registered trade mark of Orientec) equipped with a heating furnace manufactured by Toyo Baldwin (current company name: Orientec). An inner space of the heating furnace of the measuring machine for strength and elongation was previously heated at 90° C. A distance between chucks for holding the film sample was made 100 mm. In attaching the sample to the chucks of the measuring machine for strength and elongation, ventilation to the heating furnace was once stopped and a door of the heating furnace was opened. Each 25 mm of both ends of the sample in 150 mm in the lengthwise direction was sandwiched between the chucks. The distance between the chucks was made 100 mm and fixation without loosening was done so that the lengthwise direction between the chucks and the lengthwise direction of the sample were identical and the sample became horizontal. After the sample was attached to the chucks, the door of the heating furnace was quickly closed and the ventilation was started again. A stage wherein the door of the heating furnace was closed and the ventilation was started again was adopted as a starting point for measuring the shrinking stress. The shrinking stress (MPa) after 30 seconds was determined.

Method for Preparing the Polyester Resin

The polyester resins referred as raw material resins 1 to 16 were manufactured by a known method wherein polycondensation was conducted via the following esterification reaction and transesterification reaction in accordance with reaction conditions and qualities mentioned in Table 1.

Terephthalic acid and glycol (ethylene glycol, neopentyl glycol and diethylene glycol) in a specific ratio (G/T: molar ratio of glycol/terephthalic acid) were added to a polymerization device equipped with stirrer, distillation column and pressure adjuster. After that, a predetermined amount of antimony trioxide was added thereto. Under conditions wherein a reaction temperature was 240° C. and a reaction pressure was 0.35 MPa, an esterification reaction was conducted for a reaction time shown in Table 1 together with successive removal of water produced during the esterification reaction. After the reaction, predetermined amounts of trimethyl phosphate and cobalt acetate were added to give an oligomer. After that, the reaction temperature of the system was raised up to 275° C. within one hour and, during that time, the pressure of the system was gradually decreased so that a reaction vacuum degree was made 0.15 kPa. The polycondensation reaction was conducted while keeping the system together with successive removal of glycol which was produced during the polycondensation. At a stage when a predetermined stirring torque was resulted, an inner area of the reactor was purged with nitrogen so as to return to an ordinary pressure. The polyester resin was taken out from the polymerization device, solidified by cooling with water and made into pellets using a strand cutter.

TABLE 1

| | Items | Raw material resin 1 | Raw material resin 2 | Raw material resin 3 | Raw material resin 4 | Raw material resin 5 | Raw material resin 6 |
|---|---|---|---|---|---|---|---|
| Raw material charge | G/T (molar ratio of glycol/terephthalic acid) | 2.2 | 2 | 1.8 | 2.2 | 2 | 1.8 |
| Esterification reaction | reaction temperature (° C.) | 240 | 240 | 240 | 240 | 240 | 240 |
| | reaction time (hr) | 3 | 3.5 | 4 | 3 | 3.5 | 4 |
| | reaction pressure (MPa) | 0.35 | 0.35 | 0.35 | 0.35 | 0.35 | 0.35 |
| Physical properties of oligomer | OLG-AV (eq/t) | 380 | 460 | 560 | 350 | 460 | 570 |
| | OLG-OHV (eq/t) | 7010 | 6490 | 5400 | 7200 | 6400 | 5450 |
| | OLG-OH % | 94.9 | 93.4 | 90.6 | 95.4 | 93.3 | 90.5 |
| Polycondensation reaction | reaction temperature (° C.) | 275 | 275 | 275 | 275 | 275 | 275 |
| | reaction time (hr) | 2.5 | 2.5 | 2.5 | 2.8 | 2.8 | 2.8 |
| | reaction vacuum degree (kPa) | 0.15 | 0.15 | 0.15 | 0.15 | 0.15 | 0.15 |
| Compositions of resins (mol %) | terephthalic acid | 100 | 100 | 100 | 100 | 100 | 100 |
| | ethylene glycol | 65 | 65 | 65 | 65 | 65 | 65 |
| | neopentyl glycol | 25 | 25 | 25 | 25 | 25 | 25 |
| | diethylene glycol | 10 | 10 | 10 | 10 | 10 | 10 |
| Physical properties of resins | intrinsic viscosity (IV) (dl/g) | 0.71 | 0.71 | 0.71 | 0.76 | 0.76 | 0.76 |
| | carboxyl end group concentration (AV) (eq/t) | 10 | 17 | 24 | 10 | 17 | 24 |
| | color b value | 7.1 | 7.3 | 7.7 | 7.9 | 8.3 | 9 |
| | Tg (° C.) | 70 | 70 | 70 | 70 | 70 | 70 |
| Remaining metal amount (ppm) | antimony | 250 | 250 | 250 | 250 | 250 | 250 |
| | phosphorus | 100 | 100 | 100 | 100 | 100 | 100 |
| | cobalt | 10 | 10 | 10 | 10 | 10 | 10 |

| | Items | Raw material resin 7 | Raw material resin 8 | Raw material resin 9 | Raw material resin 10 | Raw material resin 11 |
|---|---|---|---|---|---|---|
| Raw material charge | G/T (molar ratio of glycol/terephthalic acid) | 2.2 | 2 | 1.8 | 2 | 2 |
| Esterification reaction | reaction temperature (° C.) | 240 | 240 | 240 | 240 | 240 |
| | reaction time (hr) | 3 | 3.5 | 4 | 3.5 | 3.5 |
| | reaction pressure (MPa) | 0.35 | 0.35 | 0.35 | 0.35 | 0.35 |
| Physical properties of oligomer | OLG-AV (eq/t) | 310 | 470 | 580 | 450 | 500 |
| | OLG-OHV (eq/t) | 7300 | 6380 | 5510 | 6420 | 6390 |
| | OLG-OH % | 95.9 | 93.1 | 90.5 | 93.4 | 92.7 |
| Polycondensation reaction | reaction temperature (° C.) | 275 | 275 | 275 | 275 | 275 |
| | reaction time (hr) | 3 | 3 | 3 | 2.5 | 2.5 |
| | reaction vacuum degree (kPa) | 0.15 | 0.15 | 0.15 | 0.15 | 0.15 |
| Compositions of resins (mol %) | terephthalic acid | 100 | 100 | 100 | 100 | 100 |
| | ethylene glycol | 65 | 65 | 65 | 61 | 65 |
| | neopentyl glycol | 25 | 25 | 25 | 30 | 20 |
| | diethylene glycol | 10 | 10 | 10 | 9 | 15 |
| Physical properties of resins | intrinsic viscosity (IV) (dl/g) | 0.82 | 0.82 | 0.82 | 0.71 | 0.71 |
| | carboxyl end group concentration (AV) (eq/t) | 10 | 17 | 24 | 17 | 17 |
| | color b value | 9.2 | 9.5 | 10.3 | 7.6 | 8 |
| | Tg (° C.) | 70 | 70 | 70 | 70 | 68 |
| Remaining metal amount (ppm) | antimony | 300 | 300 | 300 | 250 | 250 |
| | phosphorus | 140 | 140 | 140 | 100 | 100 |
| | cobalt | 10 | 10 | 10 | 10 | 10 |

| | Items | Raw material resin 12 | Raw material resin 13 | Raw material resin 14 | Raw material resin 15 | Raw material resin 16 |
|---|---|---|---|---|---|---|
| Raw material charge | G/T (molar ratio of glycol/terephthalic acid) | 2 | 1.5 | 1.5 | 2 | 2 |
| Esterification reaction | reaction temperature (° C.) | 240 | 240 | 240 | 240 | 240 |
| | reaction time (hr) | 3.5 | 5 | 5 | 3.5 | 3.5 |
| | reaction pressure (MPa) | 0.35 | 0.35 | 0.35 | 0.35 | 0.35 |
| Physical properties of oligomer | OLG-AV (eq/t) | 450 | 710 | 690 | 430 | 390 |
| | OLG-OHV (eq/t) | 6250 | 4420 | 4110 | 6270 | 6330 |
| | OLG-OH % | 93.3 | 86.2 | 85.6 | 93.6 | 94.2 |
| Polycondensation reaction | reaction temperature (° C.) | 275 | 275 | 275 | 275 | 275 |
| | reaction time (hr) | 2 | 3 | 3.5 | 2.5 | 2.5 |
| | reaction vacuum degree (kPa) | 0.15 | 0.15 | 0.15 | 0.15 | 0.15 |
| Compositions of resins (mol %) | terephthalic acid | 100 | 100 | 100 | 100 | 100 |
| | ethylene glycol | 65 | 65 | 65 | 75 | 69 |
| | neopentyl glycol | 25 | 25 | 25 | 15 | 25 |
| | diethylene glycol | 10 | 10 | 10 | 10 | 6 |
| Physical properties of resins | intrinsic viscosity (IV) (dl/g) | 0.65 | 0.71 | 0.82 | 0.71 | 0.71 |
| | carboxyl end group concentration (AV) (eq/t) | 17 | 30 | 30 | 17 | 17 |
| | color b value | 5.9 | 8.5 | 12.2 | 7 | 7 |
| | Tg (° C.) | 70 | 70 | 70 | 70 | 72 |

TABLE 1-continued

| | | | | | | |
|---|---|---|---|---|---|---|
| Remaining metal amount (ppm) | antimony | 250 | 250 | 300 | 250 | 250 |
| | phosphorus | 100 | 100 | 140 | 100 | 100 |
| | cobalt | 10 | 10 | 10 | 10 | 10 |

Examples 1 to 11 and Comparative Examples 1 to 5

Each of the resulting polyester resin was dried in vacuo at 60° C. for 48 hours. Then, it was poured into an extruder. The resin was melted at 250° C., extruded from a T die, and wound around a rotating metal roll wherein a surface temperature was cooled down to 30° C. so as to quickly cool whereupon a non-stretched film having a thickness of 190 μm was prepared. A pulling out speed (a rotating speed of the metal roll) of the non-stretched film at that time was about 20 m/min. The resulting non-stretched film was guided into a tenter, and preheated so that a surface temperature of the film became 90° C. After that, stretching to an extent of 5 times in a widthwise direction was done together with cooling so that the film surface temperature became 73° C. Then, relaxing to an extent of 5% in the widthwise direction thereof was done together with heating so that the film surface temperature became 74° C. After that, the film was cooled and both ends thereof were cut and removed so that a width of film became 500 mm, followed by winding up in a roll whereupon a uniaxially stretched film having a thickness of about 40 μm was continuously prepared in a predetermined length. Characteristics of the resulting film were evaluated according to the above-mentioned methods.

Table 2 shows compositions of the resins, physical properties of the resins, recycling evaluations, recycling property, and film properties of Examples 1 to 11 and Comparative Examples 1 to 5.

TABLE 2

| | Items | Example 1 Raw material resin 1 | Example 2 Raw material resin 2 | Example 3 Raw material resin 3 | Example 4 Raw material resin 4 | Example 5 Raw material resin 5 | Example 6 Raw material resin 6 |
|---|---|---|---|---|---|---|---|
| Compositions of resins (mol %) | terephthalic acid | 100 | 100 | 100 | 100 | 100 | 100 |
| | ethylene glycol | 65 | 65 | 65 | 65 | 65 | 65 |
| | neopentyl glycol | 25 | 25 | 25 | 25 | 25 | 25 |
| | diethylene glycol | 10 | 10 | 10 | 10 | 10 | 10 |
| Physical properties of resins | intrinsic viscosity (IV) | 0.71 | 0.71 | 0.71 | 0.76 | 0.76 | 0.76 |
| | carboxyl end group concentration (AV) | 10 | 17 | 24 | 10 | 17 | 24 |
| | color b value | 7.1 | 7.3 | 7.7 | 7.9 | 8.3 | 9 |
| Recycling evaluation (LPM extrusion) | intrinsic viscosity (IV) | 0.63 | 0.62 | 0.61 | 0.68 | 0.67 | 0.66 |
| | Δ IV | −0.08 | −0.09 | −0.1 | −0.08 | −0.09 | −0.1 |
| | carboxyl end group concentration (AV) | 20 | 27 | 36 | 20 | 28 | 37 |
| | Δ AV | 10 | 10 | 12 | 10 | 11 | 13 |
| | color b value | 8.6 | 9 | 10.1 | 8.6 | 9 | 10.1 |
| | Δ (color b value) | 1.5 | 1.7 | 2.4 | 0.7 | 0.7 | 1.1 |
| Recycling property | resin IV: 0.60 or more | o | o | o | o | o | o |
| | AV: 40 or less | o | o | o | o | o | o |
| | color b value: 15.0 or less | o | o | o | o | o | o |
| | Film IV (dl/g) | 0.64 | 0.64 | 0.63 | 0.69 | 0.68 | 0.68 |
| Heat-shrinking rate before aging (%) | 70° C. lengthwise direction | −3 | −3 | −3 | −3 | −3 | −3 |
| | 70° C. widthwise direction | 32 | 33 | 33 | 33 | 34 | 35 |
| | 98° C. lengthwise direction | 2 | 2 | 2 | 2 | 2 | 2 |
| | 98° C. widthwise direction | 72 | 71 | 72 | 72 | 72 | 72 |
| Heat-shrinking rate after aging (%) | 70° C. lengthwise direction | −3 | −3 | −3 | −3 | −2 | −3 |
| | 70° C. widthwise direction | 31 | 31 | 31 | 32 | 33 | 33 |
| | 98° C. lengthwise direction | 2 | 2 | 2 | 2 | 2 | 2 |
| | 98° C. widthwise direction | 72 | 71 | 72 | 72 | 71 | 72 |
| Difference in heat-shrinking rates before and after aging (%) | 70° C. lengthwise direction | 0 | 0 | 0 | 0 | −1 | 0 |
| | 70° C. widthwise direction | 1 | 2 | 2 | 2 | 1 | 2 |
| | 98° C. lengthwise direction | 0 | 0 | 0 | 0 | 0 | 0 |
| | 98° C. widthwise direction | 0 | 0 | 0 | 0 | 1 | 0 |
| | Natural shrinking rate after aging (%) | 0.2 | 0.3 | 0.2 | 0.2 | 0.3 | 0.2 |
| | Tensile elongation at break after aging (%) | 57 | 55 | 53 | 71 | 71 | 70 |
| | Shrinking stress (MPa) | 4.5 | 4.4 | 4.3 | 4.6 | 4.5 | 4.5 |

| | Items | Example 7 Raw material resin 7 | Example 8 Raw material resin 8 | Example 9 Raw material resin 9 | Example 10 Raw material resin 10 | Example 11 Raw material resin 11 |
|---|---|---|---|---|---|---|
| Compositions of resins (mol %) | terephthalic acid | 100 | 100 | 100 | 100 | 100 |
| | ethylene glycol | 65 | 65 | 65 | 61 | 65 |
| | neopentyl glycol | 25 | 25 | 25 | 30 | 20 |
| | diethylene glycol | 10 | 10 | 10 | 9 | 15 |
| Physical properties of resins | intrinsic viscosity (IV) | 0.82 | 0.82 | 0.82 | 0.71 | 0.71 |
| | carboxyl end group concentration (AV) | 10 | 17 | 24 | 17 | 17 |
| | color b value | 9.2 | 9.5 | 10.3 | 7.6 | 8 |
| Recycling evaluation (LPM extrusion) | intrinsic viscosity (IV) | 0.73 | 0.72 | 0.71 | 0.62 | 0.60 |
| | Δ IV | −0.09 | −0.1 | −0.11 | −0.09 | −0.11 |
| | carboxyl end group concentration (AV) | 21 | 29 | 38 | 28 | 29 |

TABLE 2-continued

|  |  |  |  |  |  |  |
|---|---|---|---|---|---|---|
|  | Δ AV | 11 | 12 | 14 | 11 | 12 |
|  | color b value | 11.5 | 12 | 13.6 | 9.3 | 10.4 |
|  | Δ (color b value) | 2.3 | 2.5 | 3.3 | 1.7 | 2.4 |
| Recycling property | resin IV: 0.60 or more | o | o | o | o | o |
|  | AV: 40 or less | o | o | o | o | o |
|  | color b value: 15.0 or less | o | o | o | o | o |
|  | Film IV (dl/g) | 0.74 | 0.74 | 0.73 | 0.64 | 0.62 |
| Heat-shrinking rate before aging (%) | 70° C. lengthwise direction | −2 | −2 | −3 | −4 | −4 |
|  | 70° C. widthwise direction | 34 | 35 | 36 | 37 | 34 |
|  | 98° C. lengthwise direction | 2 | 2 | 2 | 1 | 1 |
|  | 98° C. widthwise direction | 72 | 72 | 72 | 73 | 71 |
| Heat-shrinking rate after aging (%) | 70° C. lengthwise direction | −2 | −2 | −3 | −4 | −4 |
|  | 70° C. widthwise direction | 33 | 34 | 34 | 35 | 33 |
|  | 98° C. lengthwise direction | 2 | 2 | 2 | 1 | 1 |
|  | 98° C. widthwise direction | 72 | 72 | 72 | 73 | 71 |
| Difference in heat-shrinking rates before and after aging (%) | 70° C. lengthwise direction | 0 | 0 | 0 | 0 | 0 |
|  | 70° C. widthwise direction | 1 | 1 | 2 | 2 | 1 |
|  | 98° C. lengthwise direction | 0 | 0 | 0 | 0 | 0 |
|  | 98° C. widthwise direction | 0 | 0 | 0 | 0 | 0 |
|  | Natural shrinking rate after aging (%) | 0.3 | 0.2 | 0.3 | 0.4 | 0.1 |
|  | Tensile elongation at break after aging (%) | 86 | 85 | 85 | 48 | 85 |
|  | Shrinking stress (MPa) | 4.8 | 4.7 | 4.7 | 3.8 | 2.9 |

| Items | | Comparative Example 1 Raw material resin 12 | Comparative Example 2 Raw material resin 13 | Comparative Example 3 Raw material resin 14 | Comparative Example 4 Raw material resin 15 | Comparative Example 5 Raw material resin 16 |
|---|---|---|---|---|---|---|
| Raw material resin |  |  |  |  |  |  |
| Compositions of resins (mol %) | terephthalic acid | 100 | 100 | 100 | 100 | 100 |
|  | ethylene glycol | 65 | 65 | 65 | 75 | 69 |
|  | neopentyl glycol | 25 | 25 | 25 | 15 | 25 |
|  | diethylene glycol | 10 | 10 | 10 | 10 | 6 |
| Physical properties of resins | intrinsic viscosity (IV) | 0.65 | 0.71 | 0.82 | 0.71 | 0.71 |
|  | carboxyl end group concentration (AV) | 17 | 30 | 30 | 17 | 17 |
|  | color b value | 5.9 | 8.5 | 12.2 | 7 | 7 |
| Recycling evaluation (LPM extrusion) | intrinsic viscosity (IV) | 0.57 | 0.57 | 0.65 | 0.63 | 0.64 |
|  | Δ IV | −0.08 | −0.14 | −0.17 | −0.08 | −0.07 |
|  | carboxyl end group concentration (AV) | 26 | 45 | 47 | 28 | 27 |
|  | Δ AV | 9 | 15 | 17 | 11 | 10 |
|  | color b value | 7.4 | 11.5 | 16.3 | 8.8 | 9 |
|  | Δ (color b value) | 1.5 | 3 | 4.1 | 1.8 | 2 |
| Recycling property | resin IV: 0.60 or more | x | x | o | o | o |
|  | AV: 40 or less | o | x | x | o | o |
|  | color b value: 15.0 or less | o | o | x | o | o |
|  | Film IV (dl/g) | 0.58 | 0.61 | 0.71 | 0.64 | 0.65 |
| Heat-shrinking rate before aging (%) | 70° C. lengthwise direction | −4 | −3 | −3 | −1 | 0 |
|  | 70° C. widthwise direction | 30 | 32 | 35 | 24 | 29 |
|  | 98° C. lengthwise direction | 1 | 2 | 2 | 6 | 4 |
|  | 98° C. widthwise direction | 70 | 71 | 71 | 61 | 70 |
| Heat-shrinking rate after aging (%) | 70° C. lengthwise direction | −4 | −3 | −3 | −1 | 0 |
|  | 70° C. widthwise direction | 27 | 30 | 34 | 23 | 15 |
|  | 98° C. lengthwise direction | 1 | 2 | 2 | 6 | 4 |
|  | 98° C. widthwise direction | 70 | 71 | 71 | 61 | 70 |
| Difference in heat-shrinking rates before and after aging (%) | 70° C. lengthwise direction | 0 | 0 | 0 | 0 | 0 |
|  | 70° C. widthwise direction | 3 | 2 | 1 | 1 | 14 |
|  | 98° C. lengthwise direction | 0 | 0 | 0 | 0 | 0 |
|  | 98° C. widthwise direction | 0 | 0 | 0 | 0 | 0 |
|  | Natural shrinking rate after aging (%) | 0.4 | 0.3 | 0.3 | 0.2 | 0.6 |
|  | Tensile elongation at break after aging (%) | 15 | 49 | 79 | 60 | 40 |
|  | Shrinking stress (MPa) | 4.0 | 4.4 | 4.6 | 8.2 | 5.8 |

As will be noted from Table 2, the polyester resins of Examples 1 to 11 are excellent in the recycling property and, moreover, various characteristic properties thereof during the film preparation are very good. On the contrary, in the polyester resin of Comparative Example 1, the tensile elongation at break of the film is bad since the resin IV is low. In the polyester resin of Comparative Example 2, although physical properties of the film are good, its recycling property (ΔIV, ΔAV) is bad since the resin AV is high. In the polyester resin of Comparative Example 3, although physical properties of the film are good, its recycling property (ΔIV, ΔAV, Δ (color b value)) is bad since its resin AV and resin color b value are high. In the polyester resin of Comparative Example 4, heat-shrinkage rate as a whole is bad and shrinking stress is high since the content of neopentyl glycol is insufficient. In the polyester resin of Comparative Example 5, the heat-shrinkage rate at 70° C. in the width direction after the aging greatly lowered since the content of diethylene glycol is insufficient.

INDUSTRIAL APPLICABILITY

In the heat-shrinkable film using the polyester resin of the present invention, a decrease in the heat-shrinking rate after the aging is small and the tensile elongation at break in the non-shrinking direction after the aging is high, in spite of the fact of having the high heat-shrinking rate. Accordingly, it can be advantageously used as a label. The packaged product such as a container wherein the heat-shrinkable polyester-based film of the present invention is used as a label exhibits a beautiful appearance. Also, in the polyester resin of the present invention, it is possible to suppress the deterioration of physical properties upon the film preparation of a heat-shrinkable film. Moreover, it is possible to recycle a film which was once made into a waste at a high rate.

The invention claimed is:

1. A polyester resin for a heat-shrinkable film which contains terephthalic acid as a main component of a dicarboxylic acid component, contains ethylene glycol as a main component of a diol component, and contains from 18 to 32% by mol of neopentyl glycol and from 8 to 16% by mol of diethylene glycol when a total amount of the whole diol component in total polyester resin components is taken as 100% by mol, characterized in that it satisfies the following requirements (i) to (iii):

(i) the polyester resin has an intrinsic viscosity (IV) of from 0.70 to 0.86 dl/g;

(ii) the polyester resin has a carboxyl end group concentration (AV) of from 8 to 25 eq/t; and (iii) the polyester resin has a color b value of from 1.0 to 12.0 in an L*a*b color system.

2. A heat-shrinkable film, characterized in that, it contains the polyester resin for heat-shrinkable film mentioned in claim 1.

3. A heat-shrinkable label which is characterized in being prepared by using the heat-shrinkable film mentioned in claim 2.

4. A packaged product which is characterized in being formed by coating the heat-shrinkable label mentioned in claim 3 at least on a part of an outer periphery of a target to be packaged followed by subjecting to a heat-shrinking treatment.

* * * * *